United States Patent

[11] 3,617,830

[72] Inventor Vincent F. Perna, Jr.
 Centerport, N.Y.
[21] Appl. No. 33,225
[22] Filed Apr. 30, 1970
[45] Patented Nov. 2, 1971
[73] Assignee Phase Industries Incorporated
 Huntington, N.Y.

[54] MINIATURE FEED-THROUGH WIDE BAND BYPASS CAPACITOR ASSEMBLY
 10 Claims, 7 Drawing Figs.
[52] U.S. Cl. .................................................. 317/242, 317/249, 317/261, 333/79
[51] Int. Cl. .................................................. H01g 5/00
[50] Field of Search ......................................... 317/242, 249, 261; 333/79

[56] References Cited
UNITED STATES PATENTS

| | | | |
|---|---|---|---|
| 2,464,377 | 3/1949 | Cohen et al. | 317/242 X |
| 2,952,805 | 9/1960 | Dornfeld | 317/242 X |
| 3,223,905 | 12/1965 | Fabricius | 317/261 |
| 3,235,939 | 2/1966 | Rodrigues et al. | 317/261 UX |
| 3,308,359 | 3/1967 | Hayworth et al. | 317/242 X |

Primary Examiner—Lewis H. Myers
Assistant Examiner—A. T. Grimley
Attorney—Edward H. Loveman ABSTRACT: A miniature capacitor assembly comprises a plurality of capacitors each having laterally spaced plates embedded in a ceramic block with alternate plates terminating in contact members at opposite ends of the block. The capacitors are disposed in circumferentially spaced radial array inside a conductive ring with a conductive member at the center of the ring. The contact members contact the ring and conductive member respectively so that the capacitors are effectively in parallel with each other. The capacitors have different capacitance values whereby the assembly has an overall attenuation-frequency characteristic which is substantially flat over a range as high as 14 gigahertz.

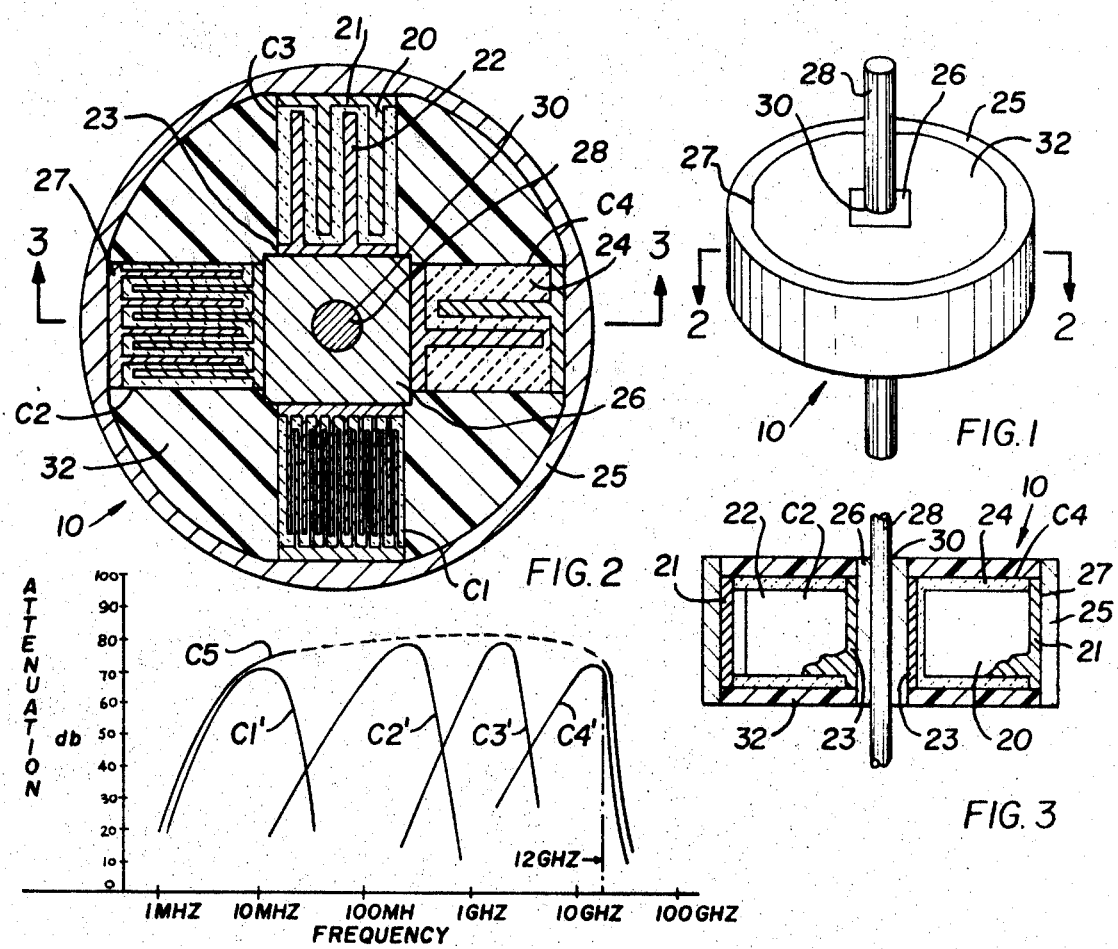
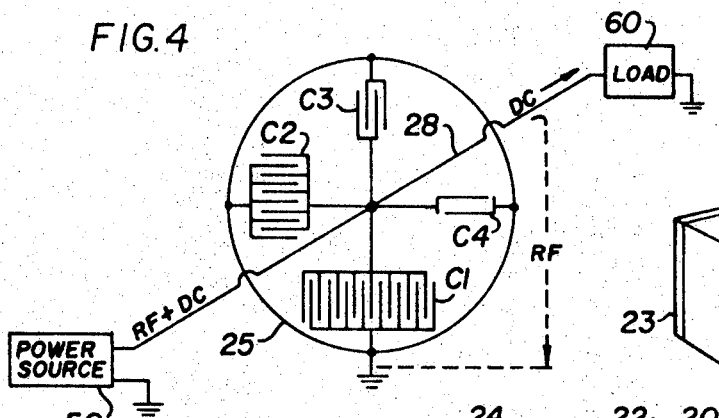
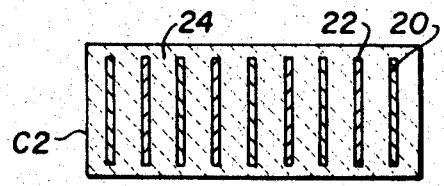
INVENTOR.
VINCENT F. PERNA JR.
BY
Edmund H. Loveman
ATTORNEY

MINIATURE FEED-THROUGH WIDE BAND BYPASS CAPACITOR ASSEMBLY

This invention relates to the art of miniature capacitors and more particularly concerns a miniature capacitor assembly useful at microwave frequencies for filtering, bypass and band-pass functions.

A difficulty encountered with conventional disc capacitors used in filters at microwave frequencies is the limited range of frequencies in which the capacitors are effective. Other objections involve their very small power-handling capacities and very small capacitance values. Above their limited effective frequency range they become inductive in nature and undesirably attenuate signal frequencies they should pass. As an example the conventional disc feed-through capacitors heretofore known when used as a bypass capacitor will pass signal frequencies in the range of 10 megahertz to 1 gigaHertz. Beyond this limited range, i.e., at lower and higher frequencies, the capacitor becomes ineffective.

The present invention is directed at overcoming the above and other difficulties and disadvantages by providing a capacitor assembly which will perform effective filtering in an extended microwave range from a frequency as low as 1 megahertz to at least 14 gigaHertz and higher.

According to the invention a plurality of multiplate, monolithic, microwave capacitors which are assembled in a radial array around a central conductor are surrounded by a conductive ring and encapsulated in low-loss epoxy plastic. The capacitors have different capacitance values which provide wide band microwave bypassing or bandpassing at substantially level attenuation valve thereby permitting direct current feed through without attenuation. The radial arrangement of very low inductance microwave capacitors assures substantially complete elimination of unwanted RF energy ranging from high harmonics to low frequency noise when used as a bypass capacitor assembly. Noise modulation from the direct current line as well as pulses from faulty power supply of associated transistors and other components are all effectively suppressed. Capacitor assemblies embodying the invention are very rugged in construction and thus are able to withstand prolonged high-humidity conditions, wide changes in operating temperatures, shock, vibration, and continuous high-temperature duty.

Accordingly, it is a primary object of the present invention to provide for an improved novel wide band bypass capacitor assembly.

Another object of the present invention is to provide a capacitor assembly which will perform effective filtering in an extended microwave range.

A more specific object of the present invention is to provide a capacitor assembly having a plurality of capacitors each having different capacitance value.

These and other objects and many of the features and advantages of this invention will readily be appreciated as the same becomes better understood by reference to the following detailed description when considered in connection with the accompanying drawings, in which:

FIG. 1 is a perspective view of a capacitor assembly embodying the invention.

FIG. 2 is a sectional view on an enlarged scale taken along line 2—2 of FIG. 1.

FIG. 3 is a sectional view taken along line 3—3 of FIG. 2.

FIG. 4 is a graphic diagram illustrating characteristics of the invention.

FIG. 5 is a diagram of the equivalent circuit of the capacitor assembly.

FIG. 6 is a further enlarged perspective view of one multiplate capacitor employed in the assembly.

FIG. 7 is a sectional view taken along line 7—7 of FIG. 6.

Referring now to the drawings, wherein like reference characters designate like or corresponding parts throughout the several views, there is shown in FIGS. 1 to 3, a capacitor assembly generally designated by reference numeral 10. The capacitor assembly 10 includes a plurality of multiple plate capacitors C1–C4. Each of the capacitors C1–C4 has a different number of laterally spaced conductive plates 20 alternating with similar conductive plates 22 which are embedded in a block 24 made of, e.g., porcelain or other ceramic. The plates 20, 22 are each integral with a respective contact plate 21, 23 which are located at opposite longitudinal ends of the block 24. FIGS. 6 and 7 show clearly a single capacitor C2 having a plurality of plates 20, 22 embedded in the block 24 with the end contact plates 21, 23, respectively integral therewith. The capacitors C1–C4 are disposed in a radial array inside a cylindrical conductive ring 25 so that the outer end plates 21 of plates 20 contact a flatland 27 inside the ring 25. Inwardly disposed end plates 23 at ends of plates 22 contact a rectangular conductive ring 26 centrally located inside the ring 25. A wire or rod 28 extends through a hole 30 in ring 26 and may be connected to a source of microwave frequencies. All spaces between the capacitors and ring 25 are encapsulated with a rigid filler 32 which may be, e.g., an epoxy plastic as shown in FIGS. 2 and 3.

FIG. 5 shows an equivalent circuit for the capacitor assembly which is arranged to feed through direct current and to bypass microwave frequencies to ground. A source 50 of direct current and radiofrequency signals is connected to the wire 28 and the cylindrical conductive ring 25 is grounded. The wire 28 is connected to a load 60 such as a plurality transistor (not shown). The capacitors C1, C2, C3 and C4 are connected in parallel between wire 28 and ground and thus radio frequency signals, undesired noise modulations, spurious pulses, and the like are bypassed to ground.

FIG. 4 illustrates graphically the wide band in the microwave region or range in which the radiofrequency bypass filtering function is effective. Curves C1' and C4' represent the attenuation-frequency characteristics of the individual capacitors C1–C4 respectively. The composite bandpass characteristic curve C5 effectively produces substantially level attenuation in an extended range from 1 megahertz to more than 12 gigaHertz. The frequency values of FIG. 4 are shown on a logarithmic scale. The attenuation is indicated in decibels (db.) on a linear scale.

As a practical example, the capacitor assembly 10 can be made as small as 0.75-inch thick and three-sixteenths of an inch in diameter. The unit can safely carry 10 amperes DC and can handle up to 10 watts C.W. These capacitors may have the following values in picofarads (pf.):

| | |
|---|---|
| C1 | 10,000 pf. |
| C2 | 1,000 pf. |
| C3 | 100 pf. |
| C4 | 10 pf. |

While an assembly of four capacitors C1–C4 has been described, various modifications are possible. The unit may have five, six or more capacitors in a radial array around a central ring inside the larger ring. Ring 26 may then be pentagonal, hexagonal, heptagonal, etc., instead of rectangular as illustrated, or if desirable ring 26 may be a ring of solder which is affixed to each of the capacitors. It should also be mentioned that the plates 21, 23 may be thin silver-plated films and that the flatland 27 in ring 25 may be dispensed with and then the gap between a capacitor and the inner wall of ring 25 be filled with solder. The assembly can be designed in other sizes, power-handling capacities, frequency ranges, attenuation-frequency characteristics, etc. Moreover, in addition to passing direct current, the assembly is capable of passing low frequency alternating current, i.e., alternating current below the range of the lowest value capacitor.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A miniature capacitor assembly comprising a plurality of miniature capacitors, each of said capacitors comprising laterally spaced conductive plates embedded in a ceramic block, and outer and inner contact members respectively joining alternate conductive plates at opposite ends of said block, a conductive cylindrical ring, a conductive member centrally located in said ring, said capacitors being disposed in circumferentially spaced radial array inside said ring with one outer contact member of each capacitor contacting said ring and the inner other contact member of each capacitor contacting said conductive member, so that said capacitors are effectively connected in parallel between said ring and said central conductive member; and a dielectric material means for encapsulating and protecting said capacitors.

2. A capacitor assembly as defined in claim 1, wherein said ring is formed with internal circumferentially spaced flatlands, said outer contact members of said capacitors being respectively juxtaposed to said lands.

3. A capacitor assembly as defined in claim 1, wherein said central conductive member is polygonal in cross section, with flat outer sides, said inner contact members contacting said flat outer sides respectively of said central conductive member.

4. A capacitor assembly as defined in claim 1, wherein said central conductive member has an axial hole, and further includes a conductor extending through said hole and electrically coupled to said central conductive member to pass direct current between an external source of power of a direct current and an external load.

5. A capacitor assembly as defined in claim 1, wherein said capacitors have respectively different numbers of plates, so that said assembly of capacitors has an overall attenuation-frequency characteristic which is substantially uniform in magnitude over a frequency band which is at least as wide as the total bandwidth of the attenuation-frequency characteristics of said individual capacitors, whereby application of a direct current and radiofrequency current between said central conductive member and an external load in a series circuit results in unattenuated passage of said direct current to said load, while said radiofrequency current is effectively bypassed between said ring and said central conductive member via said capacitors.

6. A capacitor assembly as defined in claim 1, wherein said central conductive member is rectangular in cross section with flat outer sides, and wherein said capacitors are four in number and are perpendicularly disposed to each other with said inner contact members thereof contacting said flat outer sides respectively of said central conductive member.

7. A capacitor assembly as defined in claim 6, wherein said ring is formed with internal circumferentially spaced flatlands, said outer contact members of said capacitors being respectively juxtaposed to said lands, 8. A capacitor assembly as defined in claim 7, wherein said central conductive member has an axial hole; and further includes a conductor extending through said hole and electrically coupled to said central conductive member to pass direct current and low frequency alternating current between an external source of a direct current and low frequency alternating current and an external load.

9. A capacitor assembly as defined in claim 8, wherein said capacitors have respectively different numbers of plates so that said assembly of said capacitors has an overall attenuation frequency characteristic which is substantially uniform in magnitude over a frequency band which is at least as wide as the total bandwidths of the attenuation-frequency characteristics of said individual capacitors, whereby high frequency variations in said direct current are effectively bypassed between said wire and said ring via said capacitors.

10. A capacitor assembly as defined in claim 1, wherein said capacitors have such capacitances that the bandwidth of the overall frequency-attenuation characteristic ranges from approximately 1 megahertz to at least 12 gigaHertz.

* * * * *